United States Patent [19]

Ramsey et al.

[11] 4,433,527
[45] Feb. 28, 1984

[54] HEAT SEALING FILM CUT-OFF DEVICE

[75] Inventors: Harold E. Ramsey, Wilmington; Edward E. Fischer, Newark, both of Del.

[73] Assignee: E. I. Du Pont de Nemours and Company, Wilmington, Del.

[21] Appl. No.: 294,364

[22] Filed: Aug. 19, 1981

[51] Int. Cl.³ .............................. B65B 9/12; B30B 5/02
[52] U.S. Cl. ........................................ 53/548; 53/553; 156/583.1; 493/198; 493/203; 493/208
[58] Field of Search ................................ 493/189–209; 156/583.1, 515, 251, 253; 53/455, 463, 479, 548, 550, 562, 228, DIG. 2, 547, 555, 553

[56] References Cited

U.S. PATENT DOCUMENTS

| 2,655,777 | 10/1953 | Hagen | 53/26 |
| 2,936,816 | 5/1960 | Lang | 154/42 |
| 3,011,934 | 12/1961 | Bursak | 156/367 |
| 3,024,581 | 3/1962 | Cloud | 53/28 |
| 3,191,356 | 6/1965 | Zelnick et al. | 53/182 |
| 3,284,269 | 11/1966 | Grevich | 156/198 |
| 3,415,704 | 12/1968 | Bate | 156/515 |
| 3,438,173 | 4/1969 | Omori | 53/39 |
| 3,451,870 | 6/1969 | Pearson | 156/250 |
| 3,522,135 | 7/1970 | Page | 156/583 |
| 3,551,261 | 12/1970 | Histed | 156/583 |
| 3,553,059 | 1/1971 | Stohlquist | 156/515 |
| 3,782,072 | 1/1974 | Sorensen et al. | 53/229 |
| 3,850,780 | 11/1974 | Crawford et al. | 156/583 |
| 4,048,003 | 9/1977 | Bolli | 156/515 |
| 4,134,245 | 1/1979 | Stella | 53/547 |
| 4,240,336 | 12/1980 | Grevich | 493/201 X |

Primary Examiner—A. J. Heinz

[57] ABSTRACT

A heat sealing and cut-off device for making packages with shrink film wrapping. The device includes a rotating anvil and a counter-rotating knife and clamping bars. The rotations are synchronous and independently mounted clamping bars hold the film for heat sealing and severing without scuffing.

10 Claims, 10 Drawing Figures

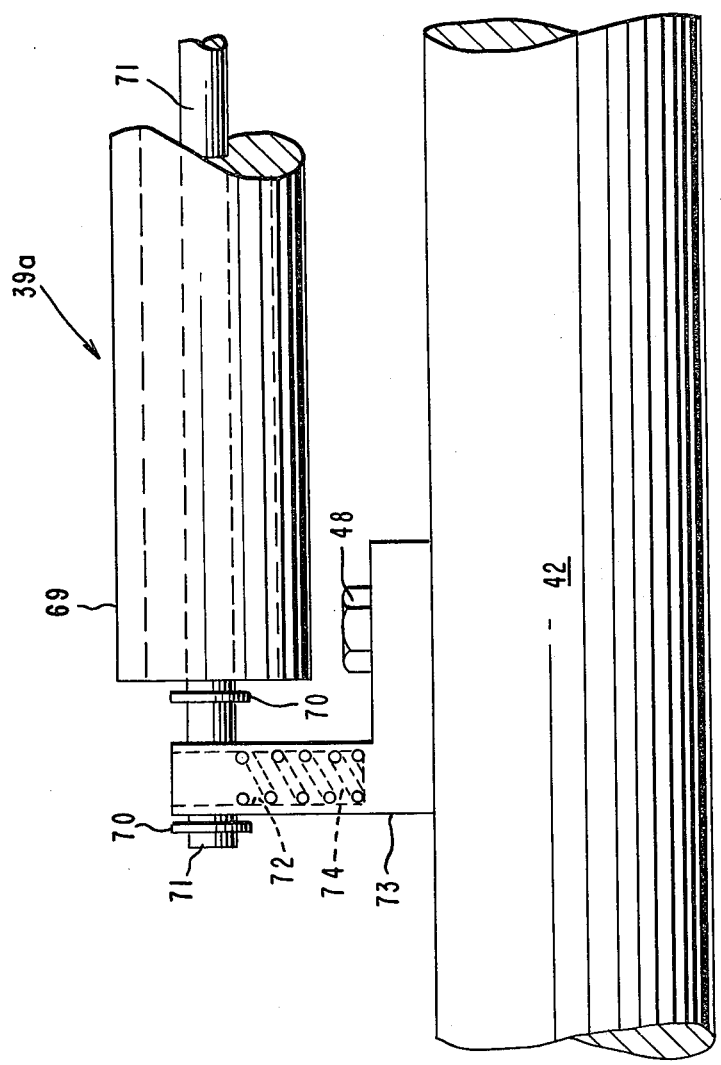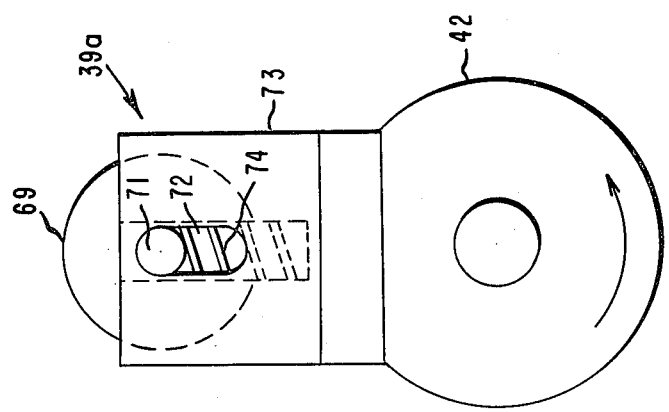

HEAT SEALING FILM CUT-OFF DEVICE

BACKGROUND OF THE INVENTION

1. Field of the Invention

The present invention relates to a device for heat sealing and severing thermoplastic film materials, especially to make packages utilizing the film as wrapping material, and especially when the film is a heat shrinkable film. The heat sealing and severing device is most often used on continuous, horizontal packaging machines in which a single web of film material is formed into a tube while a succession of objects to be wrapped is fed into the tube being formed. The device of this invention is used to make a transverse seal in the tube and to sever the tube at the seal in such way that each severed end has a transverse seal.

2. Description of the Prior Art

Heat seal and cut-off devices for thermoplastic film material have generally been constructed such that the sealing and severing element must be activated and moved in a line longitudinally with the film material to provide adequate contact time to complete the seal. Moreover, such devices have usually been designed to yield fin seals rather than bead seals in final wrapped packages.

Heat seal and cut-off devices have also been made with counter-rotating knives and anvils wherein there have been used fixed clamping bars and anvil surfaces which have a fixed radius. Such devices cause packaging film used therewith to be scratched or torn by the clamping bars and the short contact time between knife and film requires slow operation for adequate sealing.

SUMMARY OF THE INVENTION

According to this invention, there is provided a heat seal and cut-off device for use in packaging articles in tubular thermoplastic comprising an anvil assembly rotatable about a first rotational axis and having a resilient anvil surface spaced apart from the first rotational axis, a knife and clamping assembly rotatable about a second rotational axis parallel with the first rotational axis and having a knife with heating means therein fixedly mounted on the assembly parallel with the rotational axes, the knife being directed away from the second rotational axis with the knife edge spaced a minimum distance from the first rotational axis which is less than the maximum distance of the resilient anvil surface from the first rotational axis and a pair of clamping bars individually mounted on the assembly, one on either side of and parallel with the knife edge, said clamping bars being mounted by biasing means such that, in extended position out of contact with the anvil surface, each of the bars is spaced a distance from the second rotational axis which is more than the distance of the knife edge from the second rotational axis and, in contact with the anvil surface, each of the bars is held, by the biasing means, against the resilient anvil surface and the knife edge is pressed into the resilient anvil surface.

BRIEF DESCRIPTION OF THE DRAWINGS

FIG. 5 is an end elevation of an alternative anvil assembly for use in the device of this invention.

FIG. 6 is a front elevation of the alternative anvil assembly of FIG. 5.

—FIG. 9 commencing the formation of a heat seal and FIG. 10 completing a heat seal and severing film associated therewith.

DETAILED DESCRIPTION OF THE INVENTION

Figure 1:
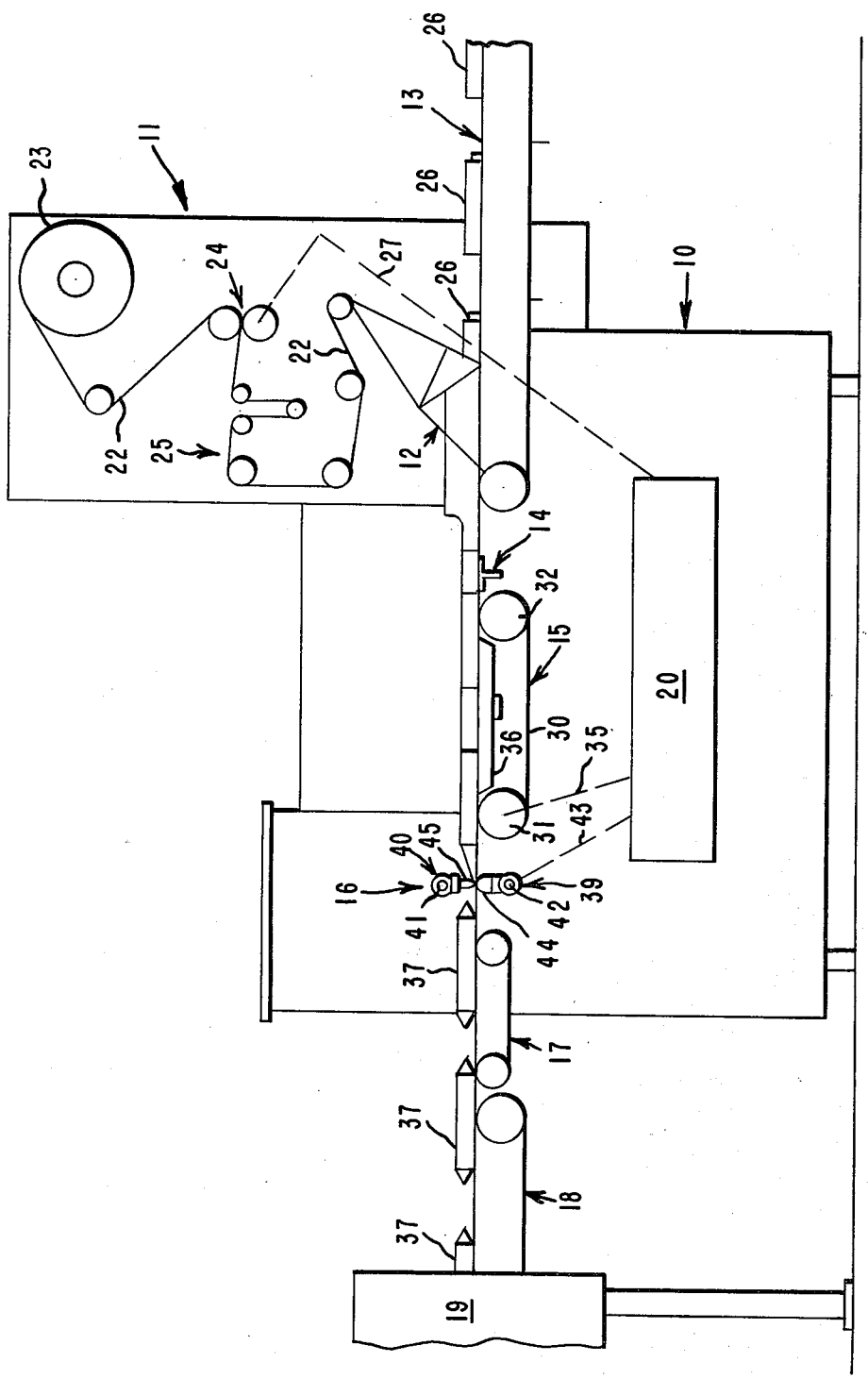
FIG. 1 is a figurative representation of a horizontal shrink-film packaging machine utilizing the heat seal and cut-off device of this invention.

Referring to FIG. 1, a packaging machine of the type which can utilize the device of this invention generally includes frame 10, film unwind and feed assembly 11, web former 12, article feeder 13, electrostatic charger 14, web advancer 15, heat sealer and cut-off device 16, conveyors 17 and 18, heat shrink tunnel 19, and drive train 20.

The film unwind and feed assembly 11 is considered to be of conventional design. In that assembly, film 22 is withdrawn from roll 23 by pull rolls 24 driven by drive train 20 as shown schematically through line 27. Film 22 is advanced over a series of transport rolls 25 and across web former 12. Web former 12 is of conventional design. Film 22, drawn across web former 12, is drawn generally downward into an inverted U-shape to receive one of a continuous succession of articles 26 from article feeder 13. An article 26 passes from article feeder 13 through web former 12 where web 22 is drawn around, and is overlapped at the bottom of, article 26. The wrapped article is then advanced over electrostatic charger 14 to cause a mutual electrostatic attraction between the overlapped edges of web 22. The electrostatic charger 14 is of a design wherein the portion of film 22 to be charged is passed between a grounded plate and a positively-charged high voltage source. The articles 26, now wrapped by a continuous length of web 22, are further advanced by the web advancer 15. Web advancer 15 is made up of a foraminous vacuum belt 30 around rolls 31 and 32 with vacuum table 36 providing a conveying surface. The rolls 31 and 32 are driven from the drive train 20 as indicated through drive line 35.

Wrapped articles are transferred from the web advancer 15 to the heat sealer and cut-off device 16. The continuous, shaped, and overlapped web 22 of wrapped articles passes through the heat sealer and cut-off device 16 whereat the web 22 is heat sealed and severed between the articles to yield individually wrapped articles 37. The heat sealer and cut-off device 16 is made up of an anvil assembly 39 and a knife and clamping assembly 40. The anvil assembly 39 comprises shaft 42 representing a first rotational axis mounted on frame 10 and an anvil surface 44. The knife and clamping assembly 40 comprises shaft 41 representing a second rotational axis mounted on frame 10 and a knife and clamping bars, identified in FIG. 1 together as 45. The shafts 41 and 42 are synchronously driven by drive train 20 as indicated through drive line 43.

After wrapped articles 37 have been severed, they are transported away from the heat seal and cut-off device 16 by conveyor 17, taken on by conveyor 18, and carried into heat shrink tunnel 19. In heat shrink tunnel 19, the film wrapping is heated to its shrink temperature to produce wrapped articles which have a tight-fitting, closely-conforming film wrapping with a fine bead seal at the end of the package.

Figure 2:
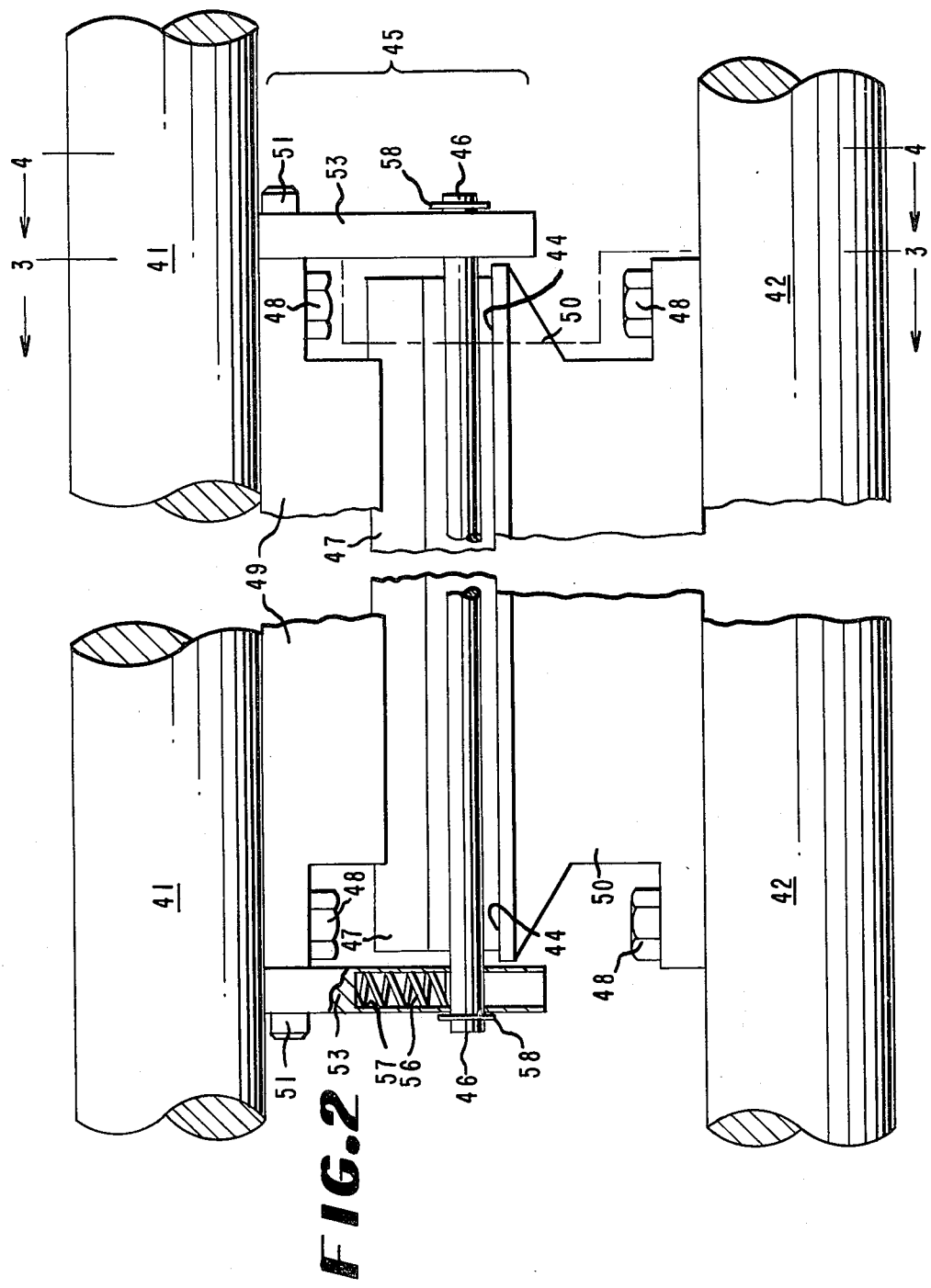
FIG. 2 is an elevation of a heat seal and cut-off device of this invention which can be used in the packaging machine of FIG. 1.

Referring to FIG. 2, anvil 50 is mounted on shaft 42 by means of machine screws 48. The anvil assembly is rotatable about the center of shaft 42 as a rotational axis and the anvil surface 44 is parallel with the rotational axis. The assembly of knife and clamping bars 45 are mounted on shaft 41 by means of machine screws 48 through bracket 49. Knife 47 is fixed in bracket 49. Plates 53 are fixed to bracket 49 by means of cap screws 51; and, on plates 53, are independently mounted clamping bars 46. Plates 53 are slotted and receive clamping bars 46 in the slots. The plates 53 are constructed with cavities 57 above the slots; and the cavities 57 are fitted with coil springs 56 to serve as a biasing means to hold the clamping bars 46 away from the rotational axis formed by shaft 41. Clamping bars 46 are retained in the slotted plates 53 by means of snap rings 58.

Figure 3:
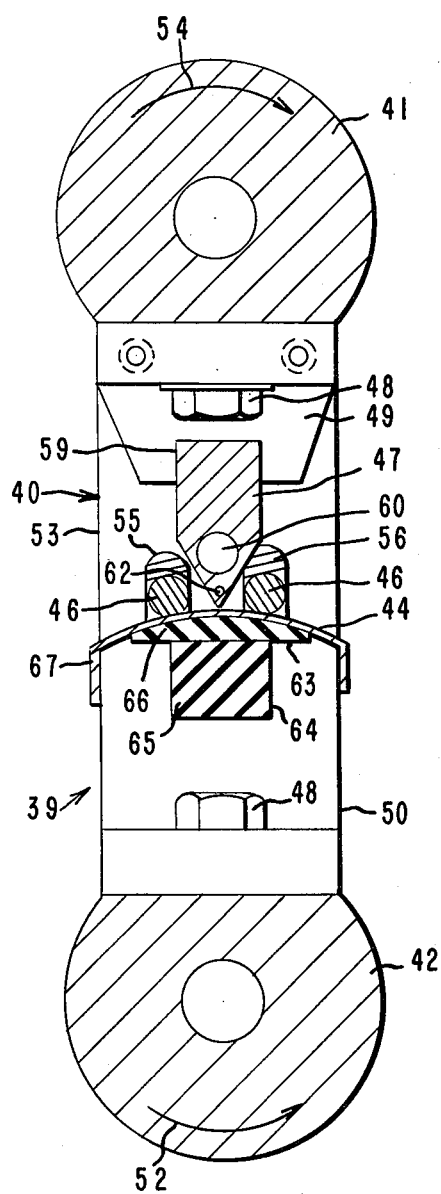
FIG. 3 is a cross-sectional view of the device of FIG. 2 taken along line 3—3 in FIG. 2.

Referring to FIG. 3, a partial section end view taken at line 3—3 from FIG. 2, anvil assembly 39, with anvil 50, machine screws 48 and shaft 42 is shown with a counterclockwise direction of rotation 52. Anvil 50 is provided with rectangular slots 63 and 64. The lower slot 64 is fitted with a resilient material 65 having a Durometer hardness of about 30 to 40; and the upper slot 63 is filled with a resilient material 66 having a Durometer hardness of about 60. The resilient material is commonly an elastomeric material and is preferably a silicone elastomer. The anvil surface 44, including the upper surface of resilient material 66, can be curved and can have a radius to the axis of rotation at the center of shaft 42. If desired or required for a surface of increased heat and wear resistance, a fluorocarbon polymer-filled glass fabric or similar high-slip material 67 can be adhered to the resilient anvil surface.

Knife and clamping assembly 40, with bracket 49, machine screws 48, and shaft 41 is shown with a clockwise direction of rotation 54. Bracket 49 has a rectangular slot 59 in which is fixed knife 47. Knife 47 is fitted with heating means 60 to supply heat for the heat sealing and film severing function of the device and with thermocouple 62 to indicate and regulate the temperature of knife 47. Knife 47 is preferably made of fine-grained cast iron with a knife edge in the form of a vee with an included angle of about 60 degrees and a knife edge radius of about 0.3 to 0.6, and preferably about 0.4 to 0.5 millimeters. The heaters and thermocouples are generally arranged to maintain operating temperatures in the range of 150° to 375° C. Bracket 49, due to high temperature generation by heating means 60, is generally made from thermally insulative material with high thermal stability. Polyimide materials are preferred.

The anvil assembly 39 and the knife and clamping assembly 40 are mounted to rotate synchronously and are spaced such that the minimum distance of the knife edge from the center of shaft 42 is less than the maximum distance of the resilient anvil surface from the center of shaft 42. The spacing is such that when the assemblies 39 and 40 are rotated into a contacting position, the edge of knife 47 is pressed into the resilient anvil surface 44. The difference in distances represents the distance which the knife 47 is pressed into the anvil surface 44 and is from 0.2 to 1.2 millimeters and is preferably about 0.6 millimeters.

Clamping bars 46 are mounted on plate 53 in slots 55. The clamping bars 46 are urged away from the rotational axis of shaft 41 by coil springs 56 mounted in plate 53 to provide biasing means against clamping bars 46. The bars 46, the slots 55, and the springs 56 are spaced such that when the assemblies 39 and 40 are out of contact, each of the bars 46 is in an extended position with the distance of the bar 46 from the center of shaft 41 more than the distance of the knife edge from the center of shaft 41. The spacing is such that when the assemblies 39 and 40 are rotated into a contacting position, both of the bars 46 contact resilient anvil surface 44, or film positioned on that surface, before knife 47 contacts such surface or film on such surface. On such contact, the bars are moved, by the biasing means, to a distance from the center of shaft 42 which is greater than the distance of the knife edge from that shaft. Being individually, freely mounted, the bars 46, when cylindrical in shape, can roll on contact with the resilient anvil surface 44 to reduce scuffing between the bars and the surface or film on the surface.

Figure 4:
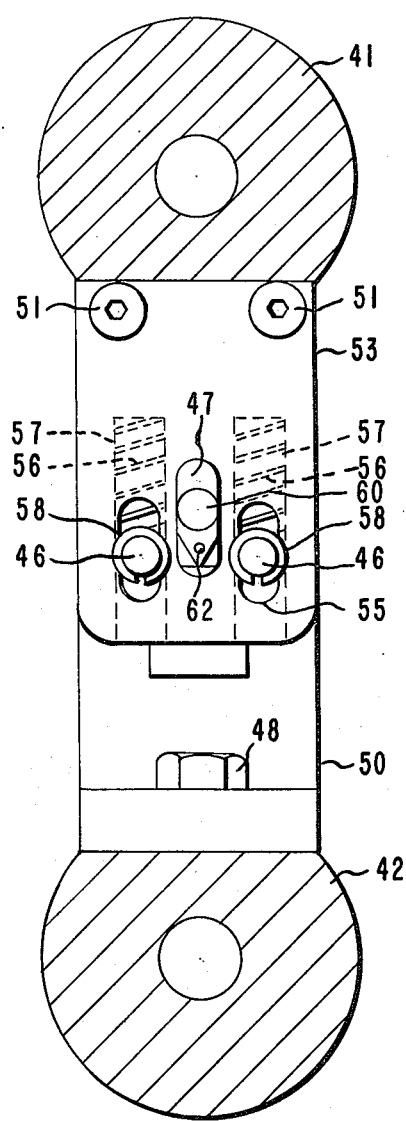
FIG. 4 is a cross-sectional view of the device of FIG. 2 taken along line 4—4 in FIG. 2.

FIG. 4, a partial section end view taken at line 4—4 from FIG. 2, provides a more detailed representation of the biasing means and slotted movement of clamping bars 46. The anvil assembly is shown with shaft 42 and anvil 50 attached thereto using machine screws 48. The knife and clamping assembly is shown with shaft 41 and plate 53 fixed thereto by cap screws 51. Knife 47 is shown behind plate 53. Cylindrical clamping bars 46 are shown retained by snap rings 58 in slots 55. Slots 55 are made in plate 53 through cavities 57; and coil springs 56 are located in cavities 57 to provide biasing means against clamping bars 46.

Referring to FIG. 5, there is depicted an alternative embodiment 39a of the anvil assembly 39 of FIG. 3. In the alternative embodiment, bracket 73 is fixed to shaft 42 and supports a cylindrical anvil 69. Cylindrical anvil 69 is mounted to be freely rotatable on shaft 71 and shaft 71 is mounted in slots 72 with biasing means characterized by coil springs 74. Cylindrical anvil 69 is made, at least on an exterior layer, from resilient material such as silicone elastomer. A preferred construction provides that anvil 69 be a steel roll with a layer of silicone elastomer and a covering layer of a fluorocarbon polymer-filled glass fabric or similar high-slip material. Alternative embodiment 39a rotates about a rotational axis at the center of shaft 42 and the resilient surface of cylindrical anvil 69 is the surface which comes into contact with the clamping bars 46 and the knife 47 of the knife and clamping assembly 40 above-discussed as FIG. 3. Because cylindrical anvil 69 is mounted against biasing means and is free to rotate, the distance between the resilient anvil surface and the rotational axis at the center of shaft 42 is reduced on contact with the knife and clamping assembly and the resilient anvil is longer wearing because new surface is contacted by the knife and clamping bars whenever the cylindrical anvil rotates. Due to the relatively small radius of the cylindrical anvil and the fact that the clamping bars contact the anvil surface at some distance away from the point of contact of the knife with the anvil surface, the clamping bars are not necessariy located at a distance from their axes of rotation which is greater than the distance of the knife from its axis of rotation.

FIG. 6 is a side view of the alternative embodiment 39a of FIG. 5. Bracket 73 is fixed to shaft 42 by machine screws 48; and cylindrical anvil 69, carried by shaft 71, is freely mounted in slots 72 of bracket 73 and held in place by coil spring 74 biasing means and snap rings 70.

Figure 7:
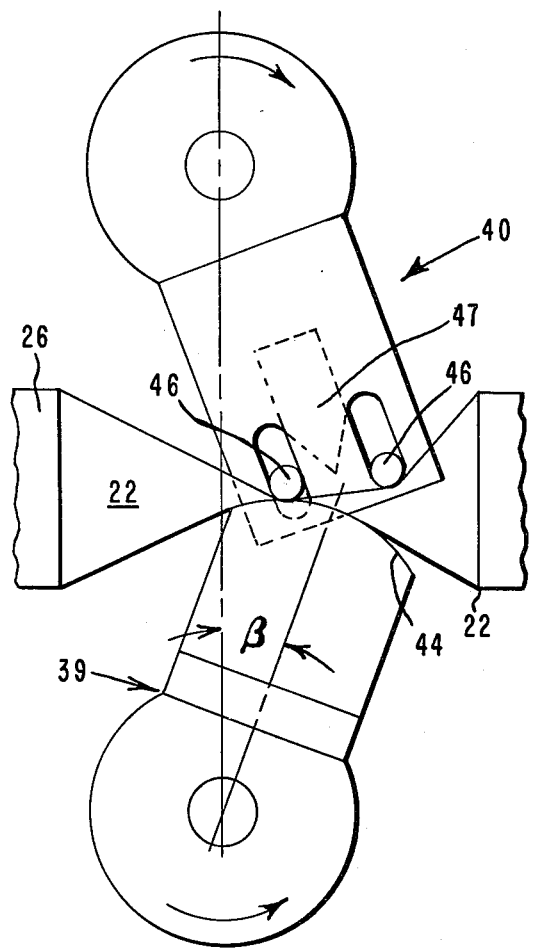
FIGS. 7 and 8 are end elevation representations of the device of FIGS. 2, 3 and 4 showing the device in operation as it contacts and collapses the wrapping film prior to sealing and severing.
Figure 8:
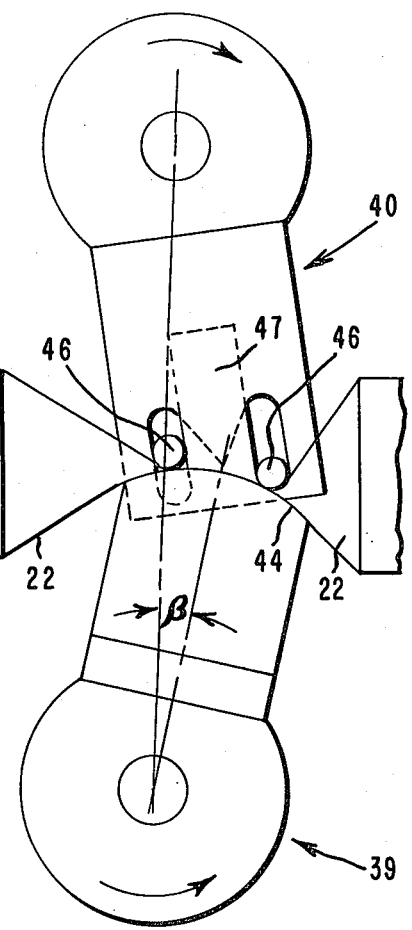

FIGS. 7 and 8 depict the heat seal and cut-off device as it contacts and collapses the wrapping film prior to sealing and severing. Anvil assembly 39 and knife and clamping assembly 40 are presented in these FIGS. without mounting details. Film 22 wrapping articles 26 is drawn between anvil assembly 39 and knife and clamping assembly 40. The assemblies 39 and 40 are synchronously rotated such that the velocity of the anvil surface 44 and velocity of the edge of knife 47 are the same as the velocity of the film 22. As the assemblies rotate, for example, as in FIG. 7, the anvil surface contacts one side of film 22 and one of the clamping bars 46 contact the other side of film 22 to commence collapse of the film. Because biasing means extends the clamping bars 46 away from the axis of rotation, film 22 is held away from the edge of knife 47. As rotation continues, for example, as in FIG. 8, the clamping bars 46 both contact film 22 and collapse it and press it into the resilient anvil surface. At the point where the film has been completely collapsed and both clamping bars contact the anvil surface, the angle β between a line through the axes of rotation and a line from the center of the anvil surface to the axis of anvil rotation, is 10 to 14, preferably about 12 degrees. As rotation proceeds through dead center, both clamping bars remain in contact with the anvil surface to an angle β of 10 to 14, preferably about 12 degrees.

Figures 9, 10:
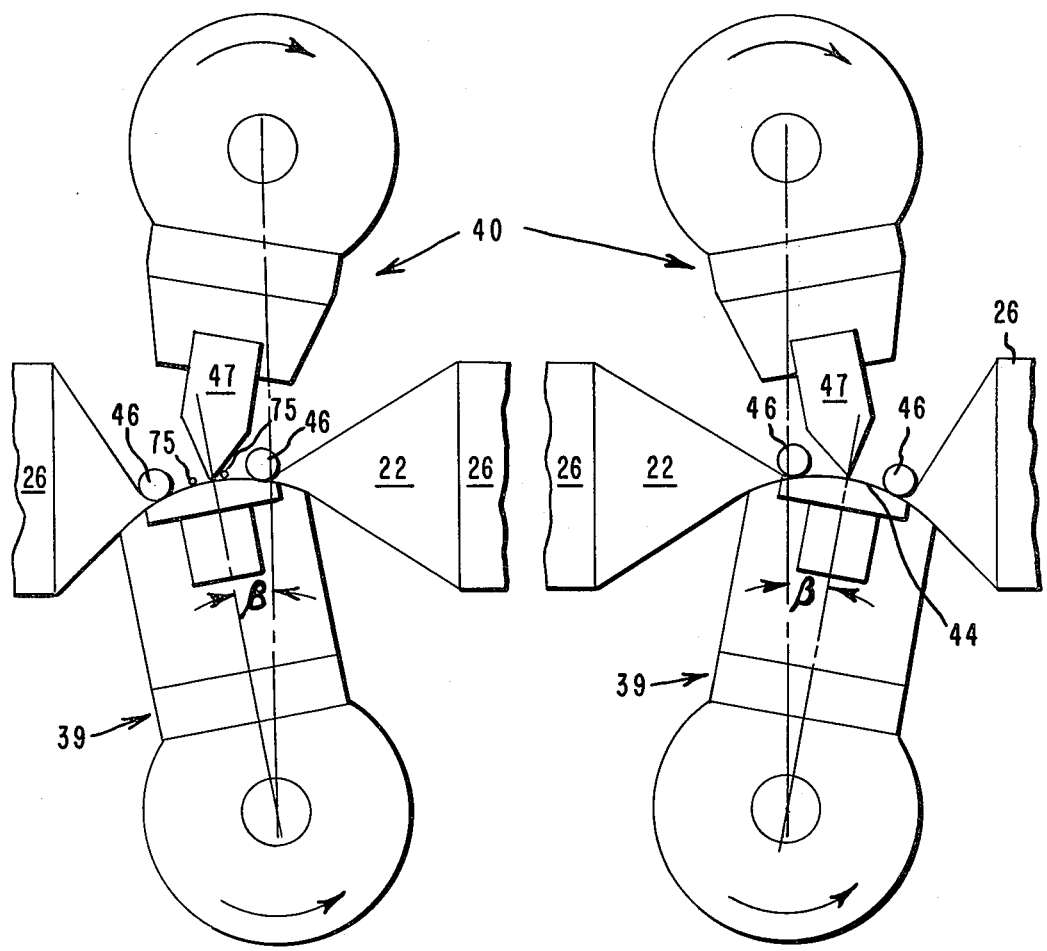
FIGS. 9 and 10 are end elevation representations showing the device in operation as it seals and severs collapsed film to produce packages.

FIGS. 9 and 10 are representations of the heat seal and cut-off device as it seals and severs collapsed film to produce packages. As anvil assembly 39 and knife and clamping assembly 40 are rotated such that both clamping bars 46 are pressing against anvil surface 44 through collapsed film 22, then knife 47 also comes into contact with anvil surface 44 through collapsed film 22.

The knife 47, during rotation of the assemblies, comes into contact with the anvil surface, through film 22, at an angle β of about 3 to 8, preferably about 5 to 6 degrees and melts and seals the film 22. The knife continues rotation through dead center, severs film 22 to yield beads 75, and then leaves contact with the anvil surface at an angle β of 3 to 8, preferably about 5 to 6 degrees. In operation, the angle at which both clamping bars contact the anvil surface must be greater than the angle at which the knife contacts the anvil surface.

In summary of preferred operation of the heat seal and cut-off device, film to be sealed and cut off is fully clamped at an angle β of about 11 to 12 degrees, the heat seal knife contacts the anvil surface and the film at an angle β of about 5 to 6 degrees, the knife seals and severs the film through an angle of about 10 to 12 degrees, the knife leaves contact with the anvil surface at an angle β of about 5 to 6 degrees, and the film remains fully clamped to permit commencement of severed bead solidification until an angle β of about 11 to 12 degrees.

We claim:

1. A heat seal and cut-off device for packaging articles in tubular thermoplastic comprising:

(a) an anvil assembly rotatable about a first rotational axis and having a resilient anvil surface spaced apart from the first rotational axis;

(b) a knife and clamping assembly rotatable about a second rotational axis parallel with the first rotational axis and having (i) a knife with a knife edge and heating means therein fixedly mounted on the assembly parallel with the rotational axis, the knife being directed away from the second rotational axis with the knife edge spaced a minimum distance from the first rotational axis which is less than the distance of the resilient anvil surface from the first rotational axis;

(ii) a pair of clamping bars individually mounted on the assembly, one on either side of and parallel with the knife edge, means for mounting said clamping bars for independent movement, and biasing means against each clamping bar for independently urging each of the bars, in extended position out of contact with the anvil surface, a distance from the second rotational axis which is more than the distance of the knife edge from the second rotational axis and, independently urging each of the bars, in a position in contact with the anvil surface, against the resilient anvil surface whereby, when said knife and clamping assembly and said anvil assembly are rotated in one rotational direction so as to move synchronously, each of the clamping bars contact the anvil surface before the knife edge contacts the anvil surface.

2. The device of claim 1 wherein clamping bars are mounted in slotted plates to permit movement toward and away from the rotational axes.

3. The device of claim 2 wherein the clamping bars are cylindrical and are freely mounted in the slotted plates to permit rotation of the individual bars and movement toward and away from the rotational axes.

4. The device of claim 2 wherein the knife edge has a radius of about 0.3 to 0.6 millimeters and sides positioned at an included angle of about 60 degrees.

5. The device of claim 1 wherein the knife edge has a radius of about 0.3 to 0.6 millimeters and sides positioned at an included angle of about 60 degrees.

6. The device of claim 1 wherein the resilient anvil surface is a cylindrical surface freely mounted to permit rotation of the surface.

7. The device of claim 6 wherein the resilient anvil surface is mounted by biasing means such that, on contact with the knife and clamping assembly, the distance is reduced between the resilient anvil surface and the first rotational axis.

8. The device of claim 1 wherein the resilient anvil surface is mounted by biasing means such that, on contact with the knife and clamping assembly, the distance is reduced between the resilient anvil surface and the first rotational axis.

9. The device of claim 1 wherein each of the clamping bars is held, by the biasing means, to a distance from the second rotational axis which is less than the distance of the knife edge from the second rotational axis.

10. In a horizontal packaging machine for continuously packaging articles in film comprising a film web feed assembly, an article feeder, a film web former for drawing the film over the articles and overlapping edges of the web at one side of the articles, an electrostatic charger to cause a mutual electrostatic attraction between the overlapped edges of the web, a foraminous vacuum belt to hold and advance the web and articles, and a means for heat sealing and severing the packages wherein the improvement comprises a heat seal and cut-off device for packaging articles in tubular thermoplastic comprising:

(a) an anvil assembly rotatable about a first rotational axis and having a resilient anvil surface spaced apart from the first rotational axis; (b) a knife and clamping assembly rotatable about a second rotational axis parallel with the first rotational axis and having (i) a knife with a knife edge and heating means therein fixedly mounted on the assembly parallel with the rotational axis, the knife being directed away from the second rotational axis with the knife edge spaced a minimum distance from the first rotational axis which is less than the distance of the resilient anvil surface from the first rotational axis; (ii) a pair of clamping bars individually mounted on the assembly, one on either side of and parallel with the knife edge, means for mounting said clamping bars for independent movement, and biasing means against each clamping bar for independently urging each of the bars, in extended position out of contact with the anvil surface, a distance from the second rotational axis which is more than the distance of the knife edge from the second rotational axis and, independently urging each of the bars, in a position in contact with the anvil surface, against the resilient anvil surface whereby, when said knife and clamping assembly and said anvil assembly are rotated in one rotational direction so as to move synchronously, each of the clamping bars contact the anvil surface before the knife edge contacts the anvil surface.

* * * * *